Sept. 4, 1962     W. O. DUNCAN     3,052,366
POWER OPERATED BALE PILERS
Filed April 18, 1960     3 Sheets-Sheet 1
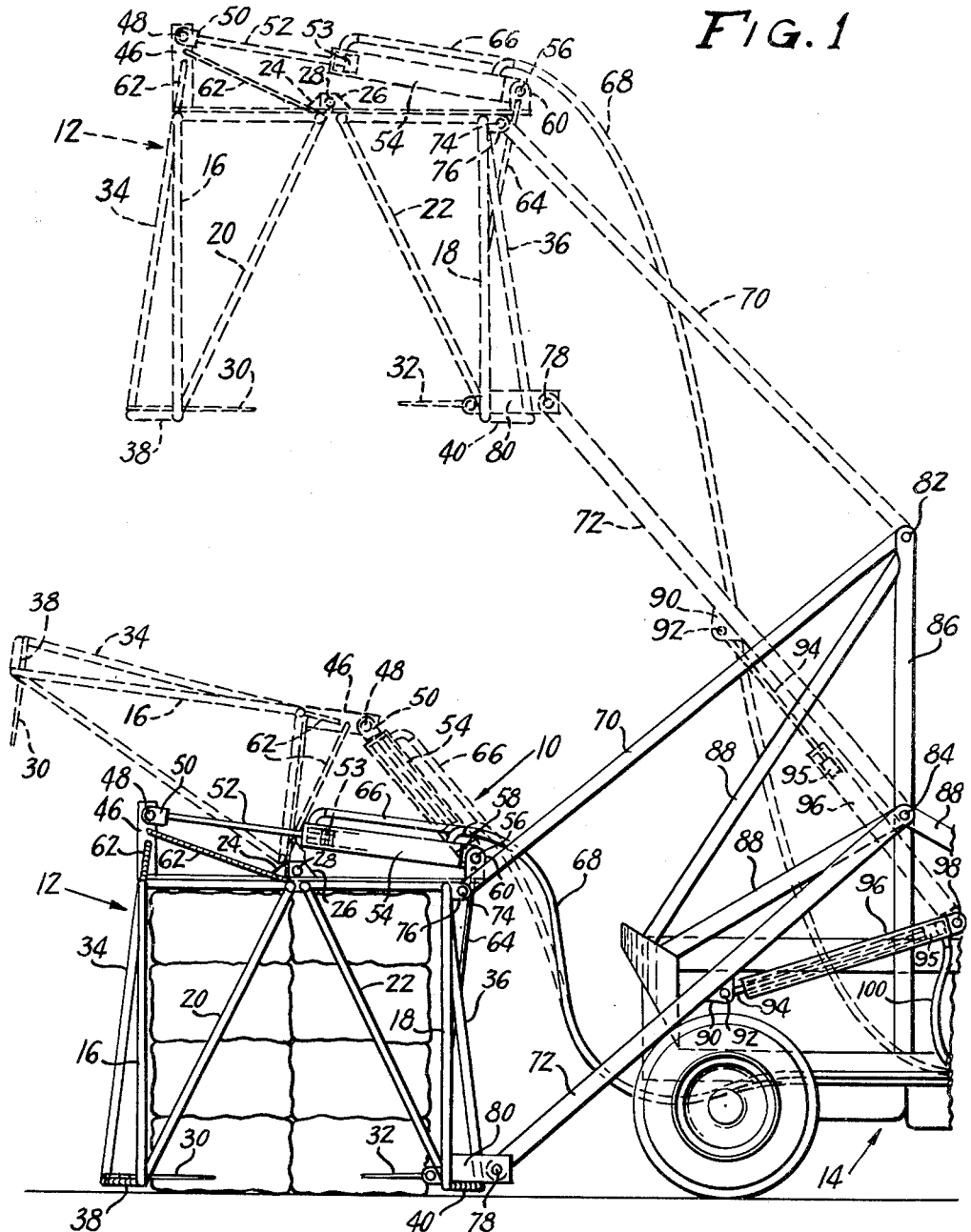
INVENTOR
WILBER O. DUNCAN
BY Gustave Miller
ATTORNEY Sept. 4, 1962 W. O. DUNCAN 3,052,366
POWER OPERATED BALE PILERS
Filed April 18, 1960 3 Sheets-Sheet 2
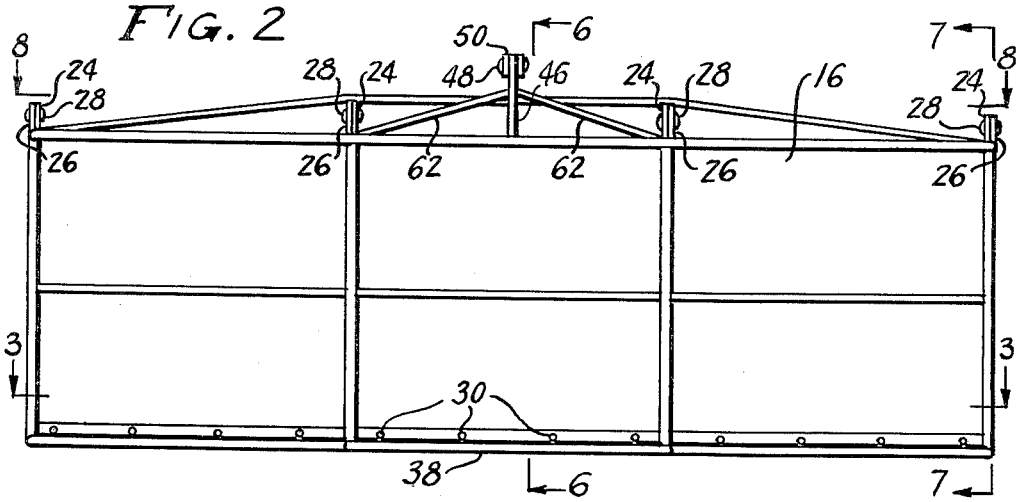
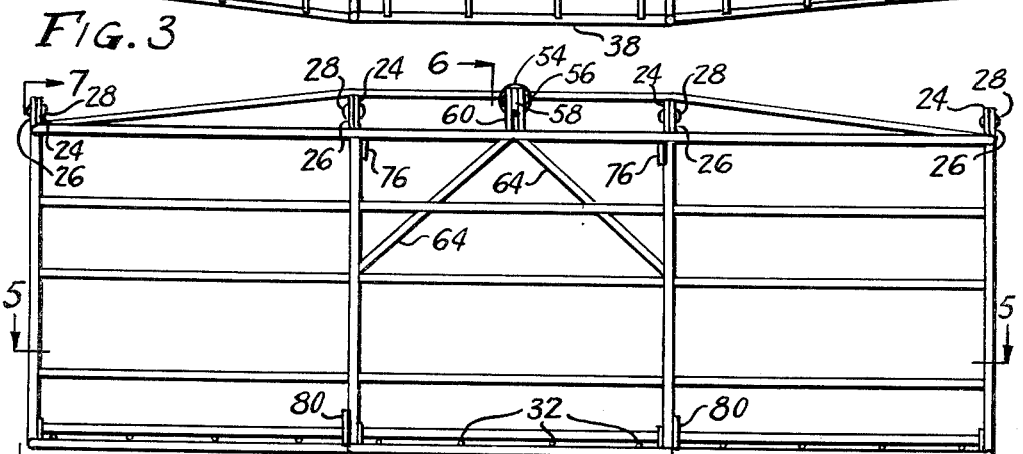
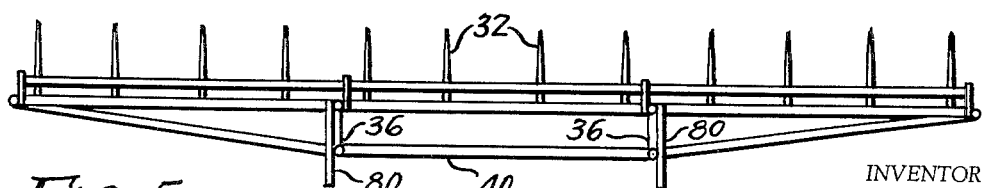
INVENTOR
WILBER O. DUNCAN
BY Gustav Miller
ATTORNEY

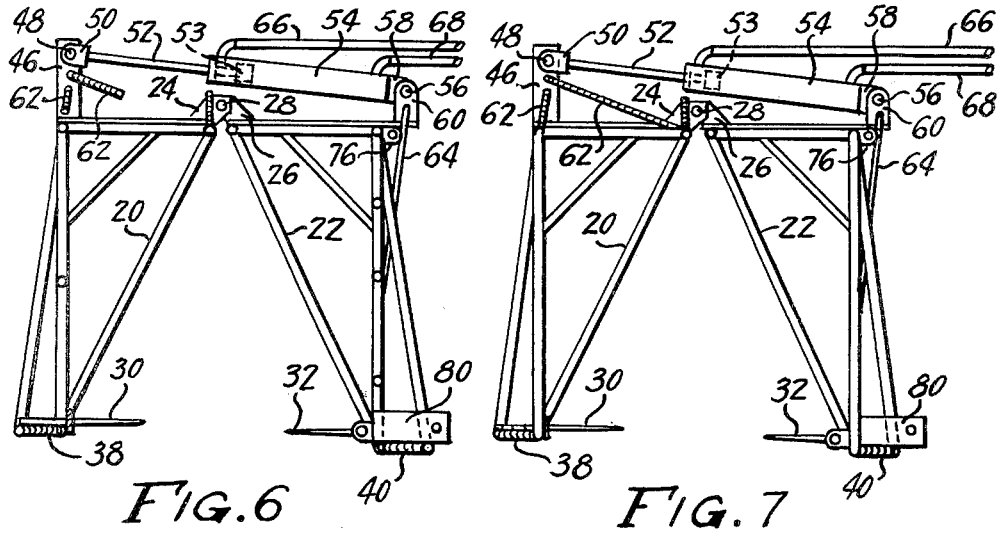
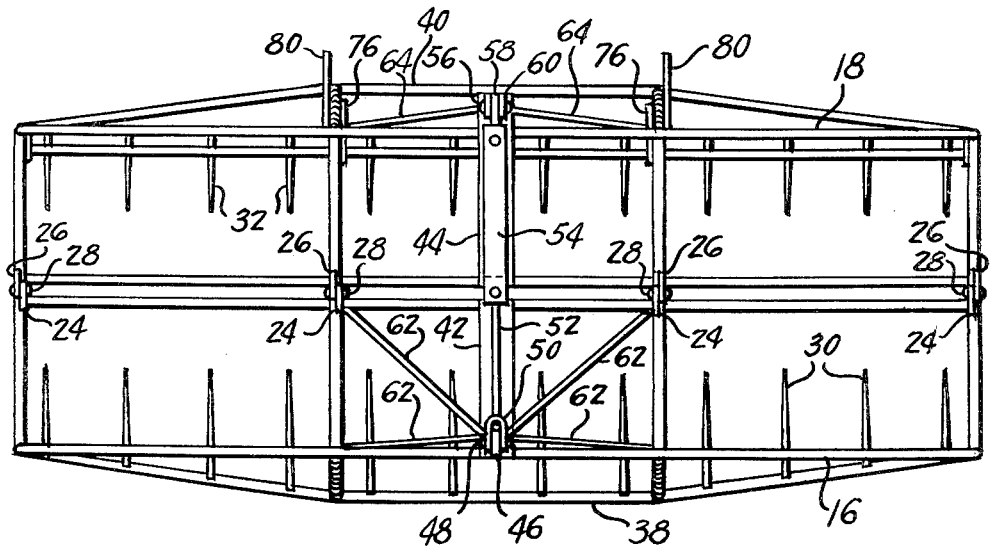

United States Patent Office 3,052,366
Patented Sept. 4, 1962

3,052,366
POWER OPERATED BALE PILERS
Wilber O. Duncan, Box 961, Steamboat Springs, Colo.
Filed Apr. 18, 1960, Ser. No. 23,065
4 Claims. (Cl. 214—147)

This invention relates to bale pilers for hay, and it particularly relates to bale pilers of the hydraulic power operated type connected to a tractor or the like.

Bale pilers, which are used to pick up bales of hay from the field and pile them one upon another in a stack, have, heretofore, generally been actuated through hydraulic controls mounted on the tractor. This meant that unduly large and complex connections were required between the hydraulic controls and the fork or pick-up means. Furthermore, most prior balers of this type were so constructed that the teeth of the pick-up means had to slide under the bales in order to grasp the piles. This often caused the teeth to bite into the ground. By biting into the ground, the teeth often became broken or blunted. They also often acted to pick up undesirable quantities of soil, stones, rocks, etc. along with the hay.

It is one object of the present invention to overcome theaforesaid difficulties by providing a bale piler which has at least some of the hydraulic controls mounted directly on the pick-up means and which acts to pick up the hay bales by dropping down over them from the top.

Another object of the present invention is to provide a bale piler of the aforesaid type which is of relatively simple construction and easy to maintain and operate.

Another object of the present invention is to provide a bale piler of the aforesaid type which is easy to install on any conventional tractor or the like.

Other objects of the present invention are to provide an improved baler, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 1 is a side elevational view of a device embodying the present invention, the device being illustrated in phantom in two alternative positions.

FIG. 2 is a front elevational view of the device of FIG. 1.

FIG. 3 is a sectional view taken on line 3—3 of FIG. 2.

FIG. 4 is a rear elevational view of the device of FIG. 1.

FIG. 5 is a sectional view taken on line 5—5 of FIG. 4.

FIG. 6 is a sectional view taken on line 6—6 of FIG. 2 and FIG. 4.

FIG. 7 is an end view taken on line 7—7 of FIG. 2 and FIG. 4.

FIG. 8 is a top plan view taken on line 8—8 of FIG 2.

Referring in greater detail to the drawings wherein similar reference characters refer to similar parts, there is shown a bale piler, generally designated 10, which comprises a bale pick-up head, generally designated 12 mounted by appropriate linkage on a prime mover such as a tractor or the like indicated at 14.

The head 12 consists of a pair of jaws 16 and 18, each being of open-work construction and of generally rectangular longitudinal shape. The open-work construction of each of the jaws 16 and 18 constitutes intersecting, transverse bars extending between a rectangular frame. At each end of the frame of each jaw is an inclined rod, such as indicated respectively at 20 and 22. These inclined rods 20 and 22 extend from an apex at the lower end of the respective jaw to a broad base at the upper end. When in closed position, the upper ends of the inclined rods 20 and 22 converge almost together whereby they form lateral end wall supports for the bales held between the jaws.

The upper inner rods or rails of the jaws 16 and 18 are each provided with complementary ears or brackets 24 and 26 respectively, and these brackets are pivotally connected by pivot pins or the like indicated at 28. At their lower ends, the jaws 16 and 18 are provided with inwardly-extending rake-like teeth, indicated respectively at 30 and 32. Brace rods 34 and 36 extending vertically, are provided for jaws 16 and 18 respectively, these rods being connected by horizontal tie rods 38 and 40 respectively.

At the center of the upper portion of jaw 16 is a transverse strip 42 while a similar strip 44 is provided at the center of the top of jaw 18. At the outer end of strip 42 is an upstanding bracket 46 to which is pivotally connected, as by pivot 48, a forked bracket 50 mounted on the end of a piston rod 52.

The piston rod 52 is provided with a piston head 53 which is positioned within a fluid pressure cylinder 54. The cylinder 54, preferably of the hydraulic type is, in turn, pivotally connected to the jaw 18 by pivot pin 56, passing through ear 58 on the end of the cylinder and through a forked bracket 60 extending upwardly from the top of jaw 18.

The brackets 46 and 60 are braced by brace rods 62 on jaw 16 and 64 on jaw 18.

The cylinder 54 is provided with inlets at opposite ends thereof and these inlets are connected to a selector valve (not shown) on the tractor 14 by means of flexible conduits shown at 66 and 68 respectively. The selector valve is connected in the ordinary manner to a source of hydraulic pressure.

By means of the above-described construction, when it is desired to open the jaws 16 and 18 of the head 12, pressure is applied through conduit 66. This causes the piston head 53 to move inwardly within the cylinder 54 and retracts the piston rod 52 (movement to the right as viewed in solid lines in FIG. 1). This causes the jaw 16 to swing upwardly around the pivot 28 to the position shown in dotted outline in FIG. 1. In this open position, the head 12 can be dropped over a bale of hay. Then the jaws are closed.

The closing movement of the jaws 16 and 18 are effected by withdrawing the pressure from conduit 66 and applying it through conduit 68. This is accomplished by means of the aforementioned selector valve. When the pressure is applied through conduit 68, it pushes the piston head 53 and piston rod 52 outwardly to the position shown in full line in FIG. 1 whereby the jaw 16 is moved around the pivot 28 into the closed position (shown in full line in FIG. 1). In this position, the teeth 30 and 32 bite into the bale and hold it firmly within the jaws.

After the head 12 has had its jaws 16 and 18 clamped about the load, the load is picked up into an elevated position and conveyed in such position to the stack where the device is manipulated to bring the head 12 into position to drop the load on the selected area. The jaws 16 and 18 are then opened in the manner described above to release the load.

The apparatus for lifting the head 12 and its load into elevated position comprises a parallel linkage which includes two pairs of links 70 and 72, each pair being laterally spaced from the other. The upper link 70 of each pair is pivotally connected at 74 to an upper bracket 76 on the rear of the jaw 18 while the lower link 72 is pivotally connected at 78 to a lower bracket 80 on the rear of jaw 18. The opposite ends of links 70 and 72 are pivotally connected at 82 and 84 respectively to a post 86 on the tractor 14. This post 86 is braced by bars 88.

The lower link 72 of each pair is provided with a bracket 90 to which is pivoted, as at 92, one end of a piston rod 94. The other end of the piston rod 94 is connected to a piston head 95 within a cylinder 96. The cylinder 96 is pivoted at 98 to the framework of the tractor 14. The cylinder 96 has an inlet at its pivoted end and to this inlet is connected a flexible conduit 100. The conduit 100 leads to a source of fluid pressure (not shown) through a valve (also not shown).

When it is desired to raise the head 12 into the position shown in dotted outline at the upper portion of FIG. 1, pressure is applied through conduit 100. This pushes out the piston and piston rod 94 which, thereupon, acts to raise the link 72 about its pivot 84. This acts to lift head 12 and also acts through head 12 to transmit a parallel swinging action to link 70. The pivoting of the links 70 and 72 results in a corresponding pivoting of the cylinder 96. When it is desired to lower the head 12, it is merely necessary to release the pressure in conduit 100 whereupon the links will move, under the force of gravity, to lower the head 12 into the position shown in full line in FIG. 1.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A bale piler arranged to be mounted on a prime mover comprising a pair of jaws constituting a pick up head, each of said jaws comprising a substantially openwork elongate rectangular frame providing a top member, a substantially openwork rectangular frame secured to and depending at right angles from an elongate rectangular edge of each said top member and providing an elongate side member therefor, and a bale penetrating plurality of gripping teeth extending at right angles from an secured along the bottom elongate edge of each said side member in opposing relation, said jaw top members being pivotally connected together at their elongate edges opposite from said elongate side member supporting edges, brace means secured to each end of each jaw and extending between the ends of said elongate pivoting edges of said jaw top members and the ends of said tooth securing bottom elongate edges of said side member, said brace members providing bale enclosing ends for said pick up head when said jaws are in bale gripping position, parallel linkage means pivotally secured at one end to said top and bottom elongate edges of one said jaw side member and pivotally secured at its other end to the prime mover, fluid pressure operating means mounted on said prime mover for operating said linkage means to raise, carry, and lower said pick up head, and a jaw operating fluid pressure operating means mounted on said pick up head and pivotally connected to each said jaw member to pivot said other jaw member toward and away from bale gripping position relative to said linkage means supported jaw member.

2. The bale piler of claim 1, each said jaw member having an upstanding bracket at the top of its said side member, said jaw operating fluid pressure operating means comprising a cylinder pivoted to one said jaw upstanding bracket, and a piston rod pivoted to the other said jaw upstanding bracket, and a piston head on said piston rod pressure operatable within said cylinder.

3. The bale piler of claim 1, and bowed tie rods connecting the ends of the bottom elongate edges of each said jaw side member, and brace rod means securing intermediate portions of said tie rods to the top elongate edge of each said jaw side member.

4. The bale piler of claim 3, and outstanding bracket means secured to said bottom elongate edge of said one jaw side member at the connection of its said brace means to said intermediate portions of said bowed tie rods, and providing a pivot mounting means for part of said supporting parallel linkage means.

References Cited in the file of this patent
UNITED STATES PATENTS

| | | |
|---|---|---|
| 2,348,899 | Guignard | May 16, 1944 |
| 2,622,915 | Horn | Dec. 23, 1952 |